United States Patent
Miura et al.

(10) Patent No.: US 12,012,060 B2
(45) Date of Patent: Jun. 18, 2024

(54) SHOCK-ABSORBING MEMBER AND MANUFACTURING METHOD THEREOF

(71) Applicant: TOYOTA SHATAI KABUSHIKI KAISHA, Kariya (JP)

(72) Inventors: Toshihisa Miura, Kariya (JP); Kazunari Kojio, Toyota (JP); Mitsuhiro Katou, Toyota (JP)

(73) Assignee: Toyota Shatal Kabushiki Kaisha, Kariya (JP)

( * ) Notice: Subject to any disclaimer, the term of this patent is extended or adjusted under 35 U.S.C. 154(b) by 836 days.

(21) Appl. No.: 17/049,562

(22) PCT Filed: Feb. 25, 2019

(86) PCT No.: PCT/JP2019/006946
§ 371 (c)(1),
(2) Date: Oct. 21, 2020

(87) PCT Pub. No.: WO2019/207936
PCT Pub. Date: Oct. 31, 2019

(65) Prior Publication Data
US 2021/0237672 A1     Aug. 5, 2021

(30) Foreign Application Priority Data

Apr. 25, 2018   (JP) .................. 2018-083888

(51) Int. Cl.
*B60R 19/34*     (2006.01)
*B29C 45/14*     (2006.01)
(Continued)

(52) U.S. Cl.
CPC ........ *B60R 19/34* (2013.01); *B29C 45/14311* (2013.01); *F16F 7/12* (2013.01);
(Continued)

(58) Field of Classification Search
CPC .... F16F 7/12; F16F 7/121; F16F 7/124; F16F 7/003; F16F 2230/0023; F16F 9/38;
(Continued)

(56) References Cited

U.S. PATENT DOCUMENTS 3,847,426 A * 11/1974 McGettigan ............ F16F 7/121
293/133
4,023,923 A * 5/1977 Kramer, Jr. ........... F24H 3/0488
431/352

(Continued)

FOREIGN PATENT DOCUMENTS

JP     2001-182769 A     7/2001
JP     2007-253905 A    10/2007
(Continued)

OTHER PUBLICATIONS

JP 2015182560 A (Year: 2015).*
(Continued)

*Primary Examiner* — Robert A. Siconolfi
*Assistant Examiner* — Mahbubur Rashid
(74) *Attorney, Agent, or Firm* — Christensen, Fonder, Dardi & Herbert PLLC

(57) ABSTRACT

A shock-absorbing member wherein a columnar shaped-wood member is supported by a stopper bolt (a pressure-receiving member) at its axially one end side and is configured such that an impact load is applied to its axially other end side, and wherein the wood member is axially collapsed by the impact load applied thereto, thereby absorbing a (Continued)

portion of the impact load, and that may include a shaft (a reinforcement member) that extends in a direction intersecting with an axis of the wood member while being embedded in the wood member, so as to reinforce the wood member.

4 Claims, 8 Drawing Sheets

(51) Int. Cl.
  *F16F 7/12* (2006.01)
  *B29K 101/12* (2006.01)
  *B29K 711/14* (2006.01)
  *B29L 31/30* (2006.01)

(52) U.S. Cl.
  CPC ............... *B29C 2045/14327* (2013.01); *B29K 2101/12* (2013.01); *B29K 2711/14* (2013.01); *B29L 2031/3044* (2013.01); *F16F 2226/04* (2013.01); *F16F 2230/0023* (2013.01); *F16F 2232/08* (2013.01); *F16F 2236/04* (2013.01)

(58) Field of Classification Search
  CPC ........... F16F 2224/0233; F16F 2226/00; F16F 2226/04; F16F 2232/08; F16F 2236/04; B60R 19/34; B60R 19/18; B60R 22/28; B60R 19/44; B60R 2019/1886; B60R 19/24; B60R 2021/0004; B60R 22/341; B60R 2019/527; B60R 2021/0273; B29C 45/14311; B29C 2045/14327; B29K 2101/12; B29K 2711/14; B29L 2031/3044
  See application file for complete search history.

(56) References Cited

U.S. PATENT DOCUMENTS

| | | | | |
|---|---|---|---|---|
| 4,352,484 A | * | 10/1982 | Gertz | .................... E01F 15/146 |
| | | | | 293/133 |
| 7,766,403 B2 | * | 8/2010 | Alvarsson | ............... B60R 19/56 |
| | | | | 293/133 |
| 2013/0306419 A1 | * | 11/2013 | Okuda | ..................... F16F 7/12 |
| | | | | 188/377 |
| 2014/0305757 A1 | | 10/2014 | Okuda | |
| 2016/0272137 A1 | * | 9/2016 | Nishimura | ............... F16F 7/003 |

FOREIGN PATENT DOCUMENTS

| | | |
|---|---|---|
| JP | 2013-117247 A | 6/2013 |
| JP | 5945992 B2 | 6/2016 |
| JP | 2017-007598 A | 1/2017 |
| JP | 2017-053365 A | 3/2017 |
| WO | WO 2013/164931 A1 | 11/2013 |

OTHER PUBLICATIONS

JP 2014184899 A (Year: 2014).*
WO 2010008559 A2 (Year: 2010).*
WO 2014077314 A1 (Year: 2014).*

* cited by examiner

SHOCK-ABSORBING MEMBER AND MANUFACTURING METHOD THEREOF

CROSS-REFERENCE TO RELATED APPLICATIONS

The present application is a 35 U.S.C. § 371 National Phase entry of, and claims priority to, PCT Application No. PCT/JP2019/006946, filed Feb. 25, 2019, which in turn claims priority to Japanese Patent Application No. 2018-083888, filed Apr. 25, 2018, both of which are hereby incorporated herein by reference in their entireties for all purposes.

BACKGROUND

The disclosure relates to a shock-absorbing member in which a wood member is collapsed when subjected to an impact load, thereby absorbing a portion of the impact load, and a manufacturing method thereof.

Art relating to the shock-absorbing member described above is described in Japanese Patent No. 5945992. In a shock-absorbing member described in Japanese Patent No. 5945992, a columnar shaped-wood member is supported by a pressure-receiving member at its axially one end side and is configured such that an impact load may be applied to its axially another end side. Therefore, when the wood member is axially collapsed by the impact load applied thereto, a portion of the impact load may be absorbed. Thus, an impact applied to the pressure-receiving member may be reduced.

However, in the shock-absorbing member described above, the wood member is axially collapsed, thereby absorbing the impact. Therefore, when the wood member is the same in size and type, a collapse-initiating load of the wood member may substantially be identical. Further, after the wood member starts to be collapsed, the wood member may be collapsed at a certain stroke under a load equal to or smaller than the collapse-initiating load, so that a portion of the impact load may be absorbed. However, under certain circumstances, it is preferable that a larger impact load may be absorbed without changing the wood member in size and type. Further, under other circumstances, it is preferable that the impact load may be absorbed in multiple steps.

Thus, there is a need in the art to provide an improved shock-absorbing member and a manufacturing method thereof.

SUMMARY

A first aspect of the disclosure may provide a shock-absorbing member wherein a columnar shaped-wood member is supported by a pressure-receiving member at its axially one end side and is configured such that an impact load is applied to its axially another end side, and wherein the wood member is axially collapsed by the impact load applied thereto, thereby absorbing a portion of the impact load, which may include a reinforcement member that is configured to reinforce the axially one end side of the wood member, or a reinforcement member that extends in a direction intersecting with an axis of the wood member while being embedded in the wood member, so as to reinforce the wood member.

According to the aspect, in a structure in which the reinforcement member is configured to reinforce the axially one end side of the wood member, when the impact load is applied to the axially another end side of the wood member, the impact load may be quickly applied to the reinforcement member via the pressure-receiving member. As a result, the wood member is collapsed and deformed while the reinforcement member is deformed or broken. Therefore, a collapse starting load of the shock-absorbing member may be equal to a total load corresponding to the sum of a load under which the wood member is collapsed alone and a load under which the reinforcement member is deformed. Conversely, in a structure in which the reinforcement member extends in the direction intersecting with the axis of the wood member while being embedded in the wood member, so as to reinforce the wood member, after the wood member is collapsed between the pressure-receiving member and the reinforcement member due to the impact load, the reinforcement member may be deformed or broken. That is, at the beginning of collapse, the shock-absorbing member may be collapsed under a collapse load under which the wood member may be collapsed alone. Thereafter, the shock-absorbing member may be collapsed under a collapse load corresponding to the sum of the collapse load under which the wood member may be collapsed alone and a load under which the reinforcement member may be deformed. Therefore, the impact load may be absorbed in a stepwise fashion. In other words, the collapse starting load of the shock-absorbing member or the subsequent collapse load may be controlled by the reinforcement member.

In a second aspect of the disclosure, the wood member is covered by a resin covering member. Further, the reinforcement member is a resin shaft that is introduced into a through bore formed in the wood member and extending in the direction intersecting with the axis of the wood member, so as to be integrated with the covering member. Therefore, the wood member may be prevented from being deformed by the reinforcement member and the covering member, so that the collapse load of the shock-absorbing member may be increased relative to the collapse load under which the wood member may be collapsed alone.

In a third aspect of the disclosure, the reinforcement member is a band-shaped member that is introduced into a through bore formed in the wood member while covering the one end side of the wood member. Therefore, the collapse starting load of the shock-absorbing member may be easily increased relative to the collapse load under which the wood member may be collapsed alone.

In a fourth aspect of the disclosure, the axially one end side of the wood member is inserted into a tubular side member extending in a vehicle front-back direction. The pressure-receiving member supporting the axially one end side of the wood member is an insertion-limiting stopper disposed in the side member. Further, the axially another end side of the wood member is connected to a vehicle bumper reinforcement member.

In a fifth aspect of the disclosure, the insertion-limiting stopper as the pressure-receiving member is a bolt that is positioned so as to extend across a space of the side member. Further, the reinforcement member intersects with the bolt.

A sixth aspect of the disclosure may provide a manufacturing method of a shock-absorbing member wherein a columnar shaped-wood member is supported by a pressure-receiving member at its axially one end side and is configured such that an impact load is applied to its axially another end side, wherein the wood member is covered by a resin covering member, wherein a reinforcement member formed as a resin shaft is introduced into a through bore extending in a direction intersecting with an axis of the wood member, so as to be integrated with the covering member, and wherein the wood member is axially collapsed by the impact load applied thereto, thereby absorbing a portion of the impact load, which may include the steps of forming the through bore in the wood member, setting the wood member having the through bore formed therein on a molding tool of an injection molding machine, and closing the molding tool of the injection molding machine and injecting melted resin materials into the molding tool, thereby molding the covering member and molding the resin shaft within the through bore of the wood member. According to the aspect, the reinforcement member may be easily formed.

DETAILED DESCRIPTION

Embodiment 1

Figure 1:
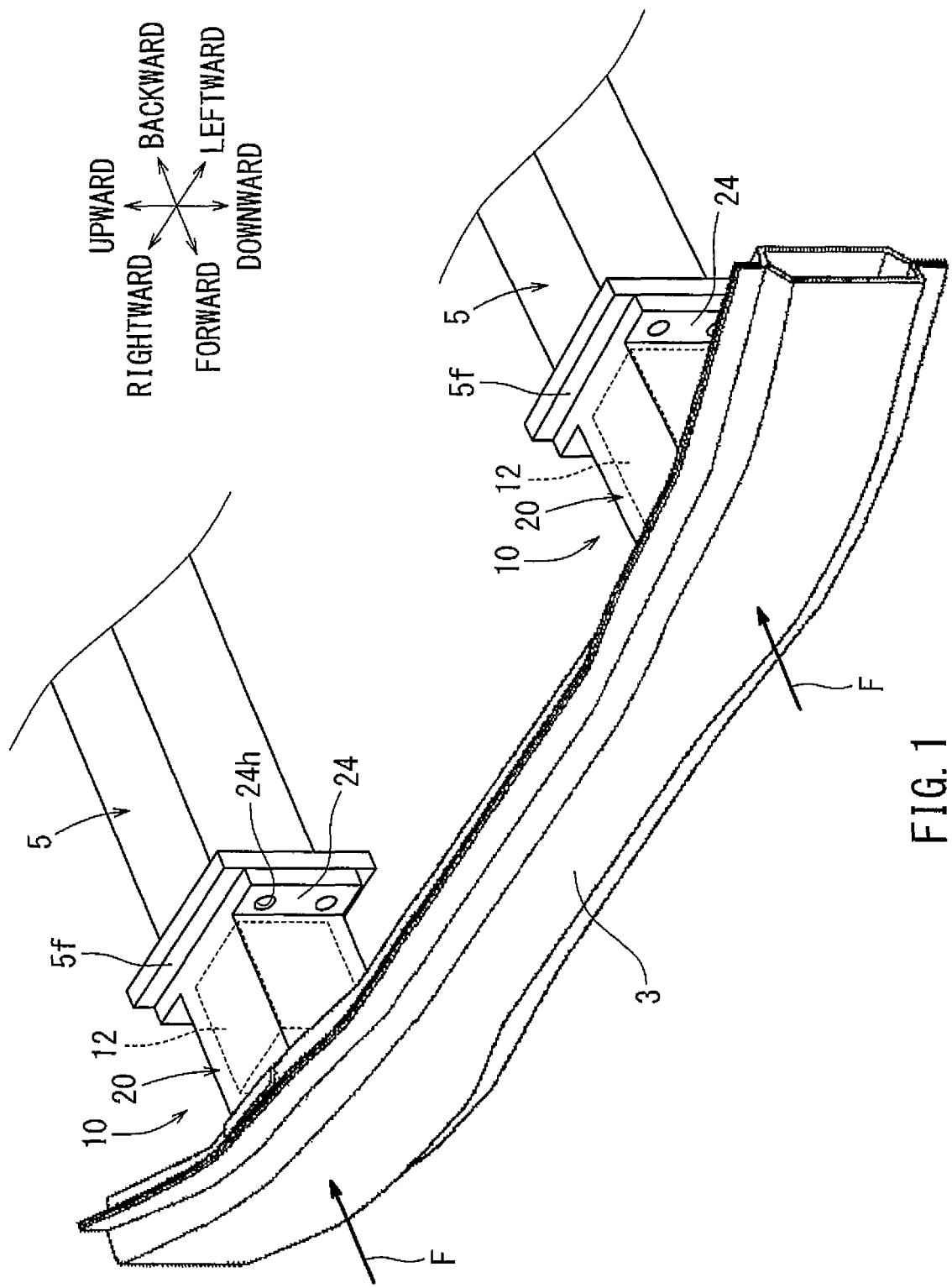
FIG. 1 is an overall perspective view of shock-absorbing members according to Embodiment 1 of the disclosure, showing a condition in which the shock-absorbing members are attached to a vehicle.

Below, shock-absorbing members according to Embodiment 1 of this disclosure will be described with reference to FIG. 1 to FIG. 14. As shown in FIG. 1, the vehicle shock-absorbing members 10 according to the present embodiment may be members that are disposed between a bumper reinforcement member 3 of a front bumper of a vehicle and side members 5 positioned on widthwise both sides (right and left sides) and extending in a vehicle front-back direction, so as to absorb an impact load F at the time of a vehicle frontal collision. Further, forward, backward, rightward, leftward, upward and downward directions described with reference to the figures may respectively correspond to forward, backward, rightward, leftward, upward and downward directions of the vehicle.

<Regarding Shock-Absorbing Members 10>

Figure 3:
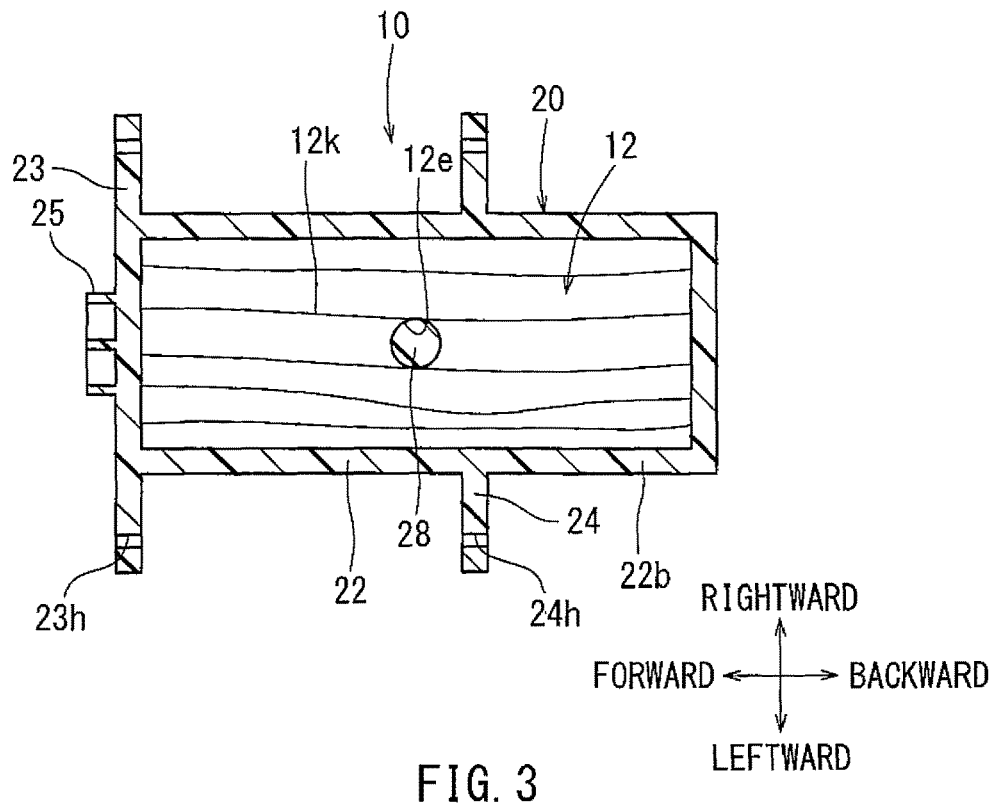
FIG. 3 is a horizontal sectional view of the vehicle shock-absorbing members (a sectional view taken along line of FIG. 2).
Figure 4:
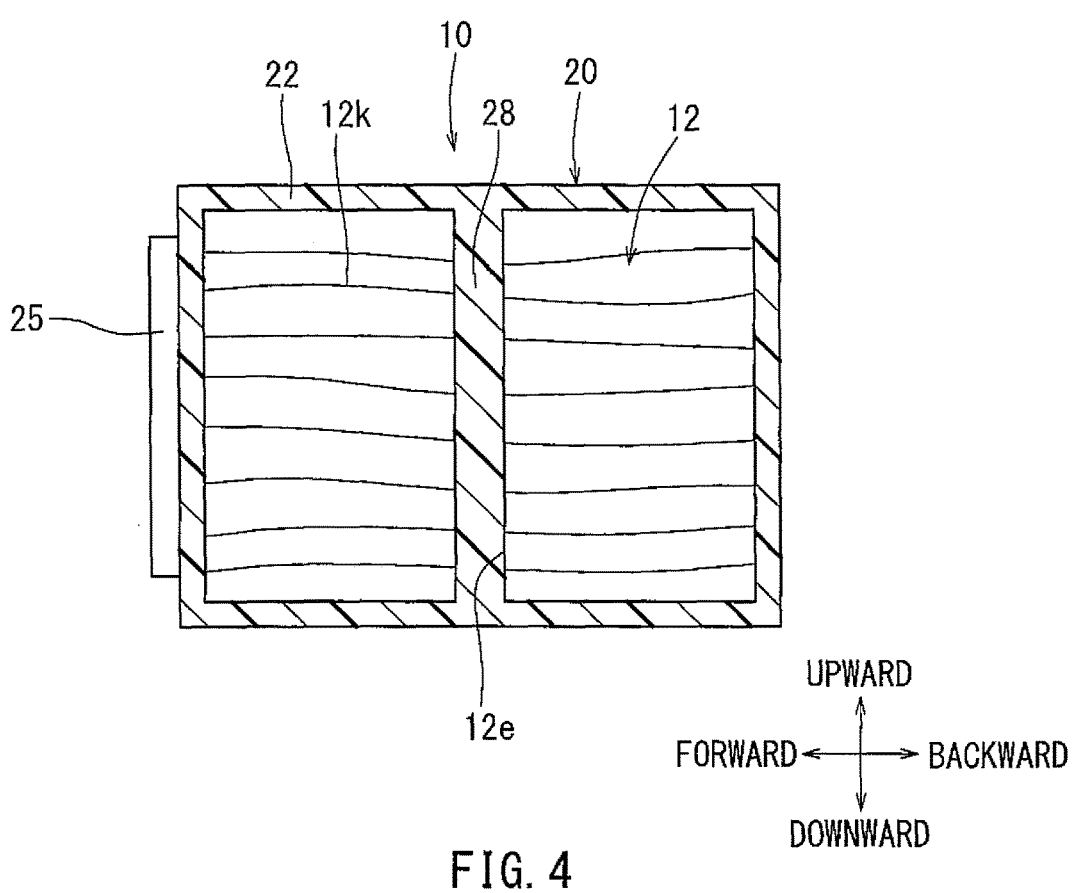
FIG. 4 is a vertical sectional view of the vehicle shock-absorbing members (a sectional view taken along line IV-IV of FIG. 2).

As shown in FIG. 3 and FIG. 4, the shock-absorbing members 10 may respectively include rectangular columnar wood members 12. As shown in FIG. 3, each of the wood members 12 may be formed such that an axis direction of annual rings 12$k$ thereof is aligned with an axis direction of a rectangular column, so as to receive the impact load F in the axis direction of the annual rings 12$k$. That is, the impact load F may be received by a portion of the wood members 12 having a high compressive strength. Therefore, the impact load F at the time of the vehicle collision may be absorbed by the wood members 12 even if the impact load F is relatively large. Further, the wood members 12 may preferably be formed of, for example, cedar wood (specific gravity of 0.38). Further, a size of each of the wood members 12 may be set to, for example, a height of 70 mm, a width of 38 mm and a length of 75 mm. The wood members 12 may respectively have vertical through bores 12$e$ formed in central portions thereof and extending perpendicular to axes of the wood members 12. Further, as shown in FIGS. 3 and 4, resin shafts 28 may respectively be introduced into the through bores 12$e$. Further, the wood members 12 may respectively be circumferentially covered by resin covering members 20.

<Regarding Covering Members 20 and Shafts 28>

Figure 2:
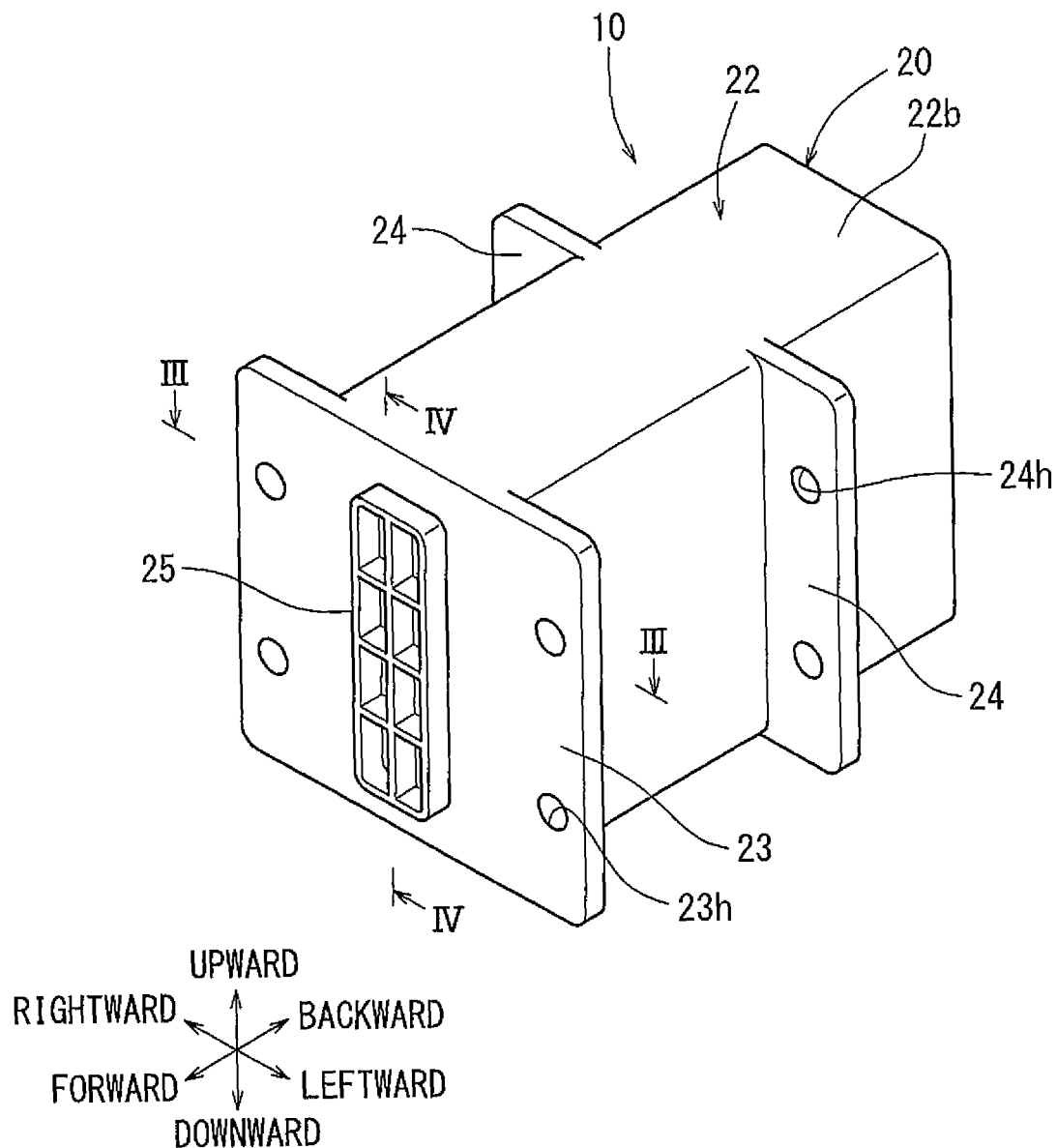
FIG. 2 is a perspective view of the vehicle shock-absorbing members.

As shown in FIG. 2, the covering members 20 may be members that fully cover the wood members 12 such that a moisture content of the wood members 12 may be prevented from being changed due to humidity level in a usage environment. Further, the covering members 20 may function to position the wood members 12 in place between the bumper reinforcement member 3 and the side members 5. The covering members 20 may be injection molded resin products. As shown in FIG. 2 to FIG. 4, the covering members 20 may respectively be composed of rectangular case-like covering bodies 22 configured to cover the wood members 12 and having a substantially uniform wall thickness, front flanges 23 formed in front end surfaces of the covering bodies 22, and rear flanges 24 formed in axial mid portions of the covering bodies 22. That is, rear portions 22$b$ of the covering bodies 22 may project backward relative to the rear flanges 24. As shown in FIG. 2 and FIG. 3, the front flanges 23 and the rear flanges 24 may respectively be formed in right and left side surfaces of each of the covering bodies 22, so as to protrude therefrom in directions perpendicular to an axis of the annual rings 12$k$ of each of the wood members 12.

Figure 7:
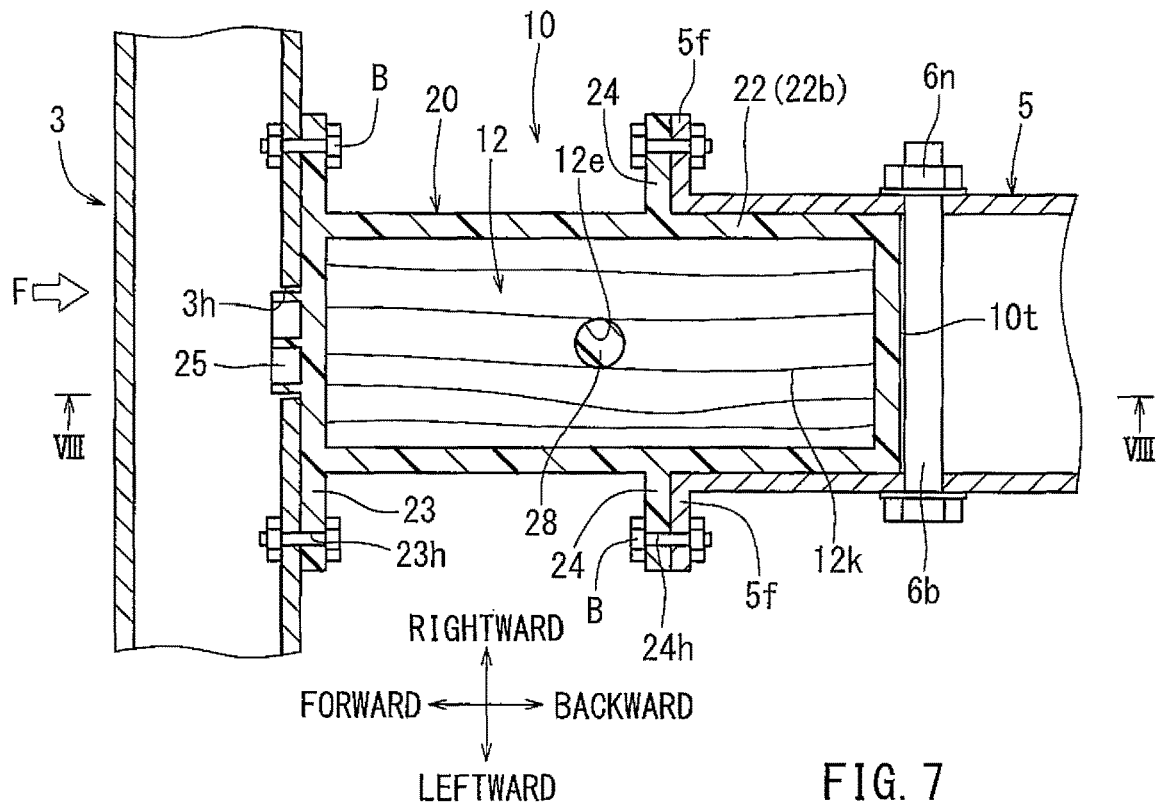
FIG. 7 is a horizontal sectional view showing an attaching structure of the vehicle shock-absorbing members.

As shown in FIG. 2, the front flanges 23 of the covering members 20 may have positioning projections 25 formed in central portions thereof and having a vertically elongated rectangular shape. The positioning projections 25 may respectively be configured to fit in positioning holes 3$h$ (FIG. 7) formed in the bumper reinforcement member 3. Further, a right end periphery and a left end periphery of each of the front flanges 23 may respectively have bolt holes 23$h$ formed therethrough and vertically spaced away from each other, so that the front flanges 23 may be connected to the bumper reinforcement member 3 by bolts B using the bolt holes 23$h$. As shown in FIG. 7 and other figures, the rear portions 22$b$ of the covering bodies 22 of the covering members 20 may respectively be sized so as to be inserted into the side members 5. Further, a right end periphery and a left end periphery of each of the rear flanges 24 of the covering members 20 may respectively have bolt holes 24h formed therethrough and vertically spaced away from each other. Therefore, the rear flanges 24 of the covering members 20 may respectively be connected to flanged portions 5f of the side members 5 by bolts B in a condition in which the rear portions 22b of the covering members 20 (the covering body 22) are inserted into the side members 5.

The shafts 28 may be members that are configured to reinforce the wood members 12 so as to prevent the wood members 12 from axially deforming (collapsing). The shafts 28 may be integrally formed with the covering members 20 when the covering members 20 are injection molded. Thermoplastic resins may be used to form the covering members 20 and the shafts 28. Examples of the thermoplastic resins are polyolefin resins such as polypropylene and polyethylene, polycarbonate resins, polyester resins such as polyethylene terephtalate and polybutylene terephtalate, polystyrene resins, and acrylic resins. Further, the shafts 28 may be referred to as reinforcement members in this disclosure.

<Regarding Manufacturing Method of Shock-Absorbing Members 10>

Figure 5:
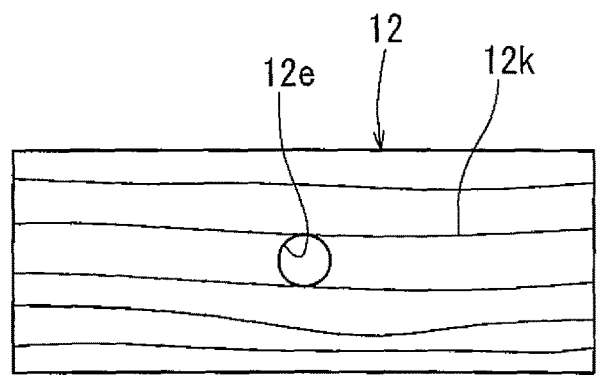
FIG. 5 is a plan view showing a manufacturing process of the vehicle shock-absorbing members (a plan view of a wood member).
Figure 6:
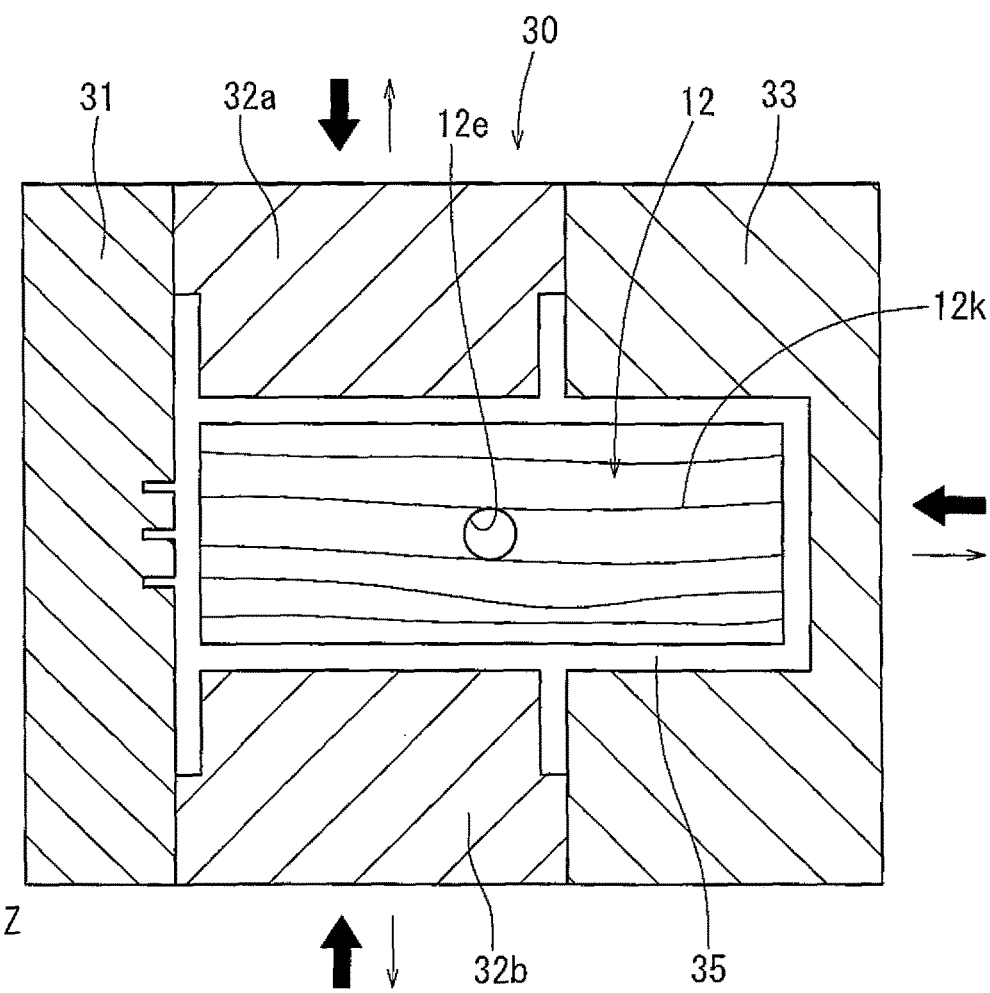
FIG. 6 is a schematic horizontal sectional view of a molding tool that is used in the manufacturing process of the vehicle shock-absorbing members.

As shown in FIG. 5, first, the wood members 12 may be formed into a rectangular columnar shape. At this time, each of the wood members 12 may be formed such that the axis direction of the annual rings 12k is aligned with the axis direction of the rectangular column. Further, the vertical through bores 12e may respectively formed in the central portions of the wood members 12 so as to be perpendicular to the axes of the wood members 12. Next, as shown in FIG. 6, each of the wood members 12 may be set on a molding tool 30 of an injection molding machine. The molding tool 30 may include a stationary die 31, a pair of laterally movable dies 32a, 32b capable of moving in an X-direction relative to the stationary die 31, and an axially movable die 33 capable of moving in a Z-direction relative to the stationary die 31.

In particular, each of the wood members 12 may be placed on a predetermined position in the molding tool 30 in a condition in which the laterally movable dies 32a, 32b and the axially movable die 33 respectively move in directions indicated by thin arrows in FIG. 6 relative to the stationary die 31, i.e., in a condition in which the molding tool 30 is opened. Next, the laterally movable dies 32a, 32b and the axially movable die 33 respectively move in directions indicated by thick arrows relative to the stationary die 31, so that the molding tool 30 is closed. As a result, a cavity 35, i.e., a space in which each of the covering members 20 is to be molded, may be defined within the molding tool 30. In this condition, the through bore 12e of each of the wood members 12 is in communication with the cavity 35. Further, positioning pins which position each of the wood members 12 in the predetermined position in the molding tool 30 and a plurality of injection ports through which resin materials are injected into the cavity 35 may be omitted in FIG. 6.

When the molding tool 30 is closed as described above, the resin materials melted by heat may be injected into the molding tool 30 under a predetermined pressure. As a result, the resin materials melted by heat may be filled in the cavity 35 and the through bore 12e of each of the wood members 12. Thereafter, when the resin materials injected into the molding tool 30 are solidified, each of the covering members 20 and the shafts 28 integrally formed with the covering members 20 may be formed. After the resin materials injected into the molding tool 30 are solidified (a cooling-down period of 15 seconds), the molding tool 30 may be opened, so that each of the covering members 20 in which each of the wood members 12 is embedded is removed from the molding tool 30. Further, in each of the covering members 20, the bolt holes 23h of the front flange 23 and the bolt holes 24h of the rear flange 24 may respectively be formed in a post-injection process.

<Regarding Attachment of Shock-Absorbing Members 10 to Vehicle>

Figure 8:
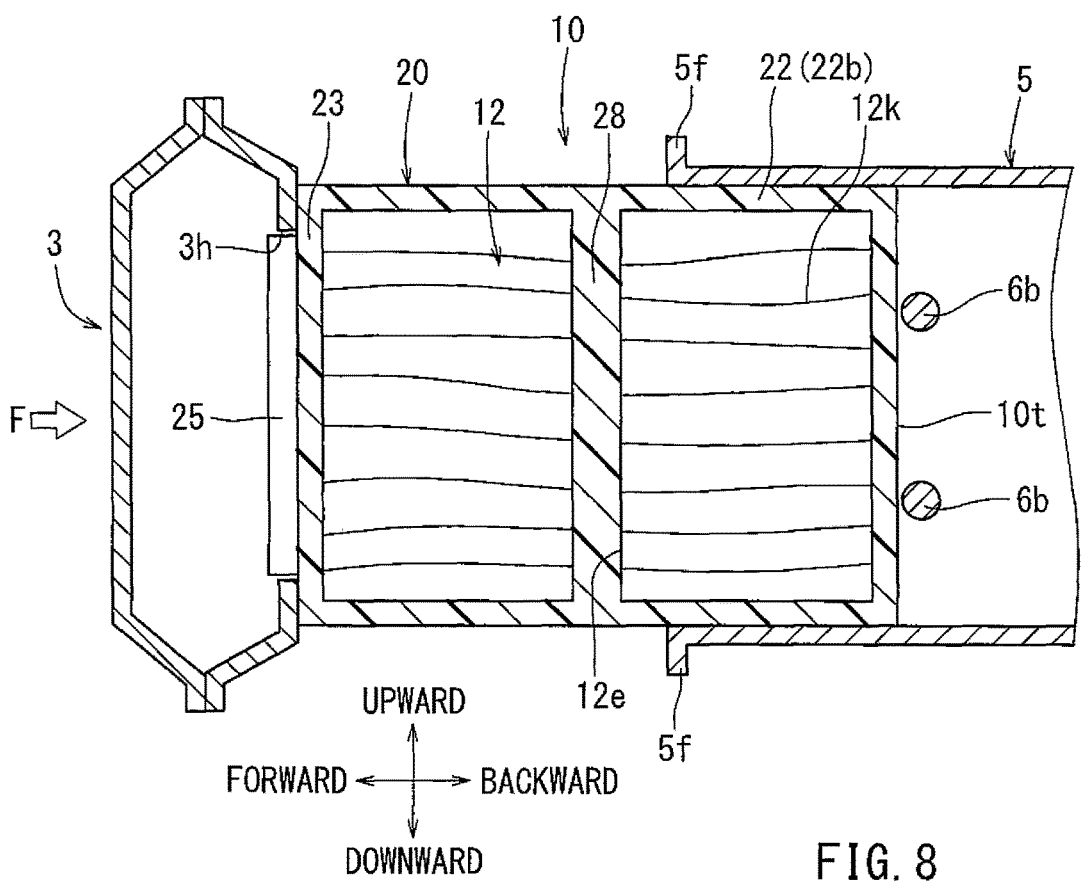
FIG. 8 is a vertical sectional view showing the attaching structure of the vehicle shock-absorbing members.
Figure 9:
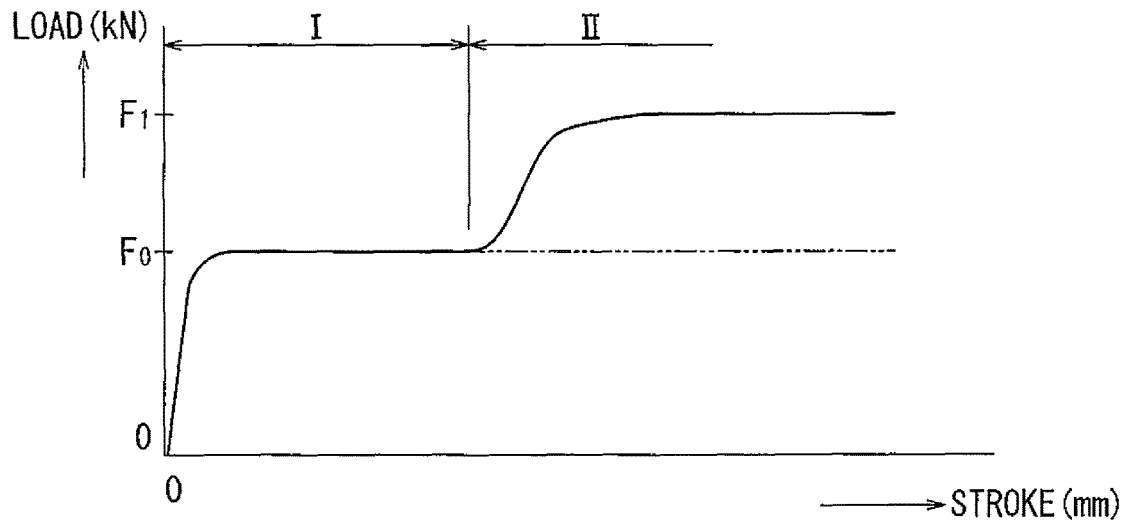
FIG. 9 is a graph illustrating a relationship between a collapse-initiating load and a collapsing stroke in the vehicle shock-absorbing members.

As shown in FIG. 7 and FIG. 8, the side members 5 to which the shock-absorbing members 10 are attached may be formed to have a rectangular tubular shape and configured such that rear portions of the shock-absorbing members 10, i.e., the rear portions 22b of the covering bodies 22 of the covering members 20 and rear portions of the wood members 12, can be axially inserted thereinto. Further, each of the side members 5 may be provided with a pair of upper and lower stopper bolts 6b with which each of rear end surfaces 10t of the shock-absorbing members 10 inserted into the side members 5 may make contact. The stopper bolts 6b may function as an insertion-limiting stopper of the shock-absorbing members 10. The stopper bolts 6b may laterally penetrate the side members 5. Nuts 6n may be attached to male screw portions formed in distal ends of the stopper bolts 6b, so that the stopper bolts 6b may be secured to the side members 5.

Therefore, the shafts 28 (the reinforcement members) respectively vertically penetrating the wood members 12 of the shock-absorbing members 10 may orthogonally intersect with the stopper bolts 6b. An insertion motion of the rear portions 22b of the shock-absorbing members 10 may be stopped when the rear end surface 10t of each of the shock-absorbing members 10 contact the pair of upper and lower stopper bolts 6b. In this condition, the rear flanges 24 of the covering members 20 of the shock-absorbing members 10 may respectively be connected to the flanged portions 5f of the side members 5 using the bolts B. Additionally, as shown in FIG. 7, the front flanges 23 may be connected to the bumper reinforcement member 3 using the bolts B in a condition in which the positioning projections 25 respectively formed in central portions of front end surfaces of the shock-absorbing members 10 (in the central portions of the front flanges 23 of the covering members 20) are fitted into the positioning holes 3h formed in the bumper reinforcement member 3. Thus, an attaching operation of the shock-absorbing members 10 to the vehicle may be completed. Further, a rear end side of each of the shock-absorbing members 10 may be referred to as one end side of each of the wood members in this disclosure. Conversely, a front end side of each of the shock-absorbing members 10 may be referred to as another end side of each of the wood members in this disclosure. Further, the stopper bolts 6b laterally penetrating the side members 5 may be referred to as pressure receiving members in this disclosure.

As described above, the rear portions 22b of the shock-absorbing members 10 can be axially inserted into the side members 5. Therefore, axes of the side members 5 and the axes of the wood members 12 of the shock-absorbing members 10 may be maintained coaxially with each other. Further, when the impact load F is applied to the shock-absorbing members 10 via the bumper reinforcement member 3, the shock-absorbing members 10 (the wood members 12) may be prevented from being inclined relative to the side members 5. That is, the wood members 12 of the shock-absorbing members 10 may receive the impact load F applied to the vehicle in the axis direction of the annual rings 12k between the bumper reinforcement member 3 and the stopper bolts 6b of the side members 5.

<Regarding Action of Shock-Absorbing Members 10>

As shown in FIG. 7 and FIG. 8, when the impact load F is applied to the bumper reinforcement member 3 due to the vehicle frontal collision, the impact load F may act on the shock-absorbing members 10 in such a direction as to push the shock-absorbing members 10 into the side members 5. At this time, the rear flanges 24 of the covering members 20 of the shock-absorbing members 10 may be broken, so that the shock-absorbing members 10 may be further pushed into the side members 5. Therefore, the impact load F is axially applied to the wood members 12 of the shock-absorbing members 10 (in the axis direction of the annual rings 12$k$) via the bumper reinforcement member 3 and the stopper bolts 6$b$ of the side members 5. As a result, the stopper bolts 6$b$ of the side members 5 may bite into the wood members 12 of the shock-absorbing members 10, so that the wood members 12 may be axially collapsed. Thus, the impact load F may be absorbed due to deformation or other such changes of the wood members 12.

In particular, in an initial stage of application of the impact load F to the bumper reinforcement member 3, the wood members 12 may be collapsed between the shafts 28 (the reinforcement members) of the shock-absorbing members 10 and the stopper bolts 6$b$ of the side members 5. In this stage, as shown by a stroke range I in FIG. 9, the shock-absorbing members 10 may be axially collapsed under a collapse load F0 substantially equal to a collapse load under which the wood members 12 may be collapsed alone. However, after the wood members 12 are collapsed between the shafts 28 and the stopper bolts 6$b$, the shafts 28 may be deformed while the wood members 12 may be collapsed in portions positioned before the shafts 28. In this stages, as shown by a stroke range II in FIG. 9, the shock-absorbing members 10 may be axially collapsed under a collapse load F1 corresponding to the sum of the collapse load F0 under which the wood members 12 may be collapsed alone and a load under which the shafts 28 may be deformed. That is, the shock-absorbing members 10 according to the present embodiment may absorb the impact load F in two stages.

Further, the stroke range I may be controlled by changing distances between the shafts 28 (the reinforcement members) of the shock-absorbing members 10 and the stopper bolts 6$b$ (the pressure receiving members) of the side members 5. Further, an increment of collapse load [ΔF=F1−F0] in FIG. 9 may be controlled by changing a diameter of each of the shafts 28 and the number of the shafts 28.

<Advantages of Shock-Absorbing Members 10 of Present Embodiment>

In the shock-absorbing members 10 of this embodiment, the shafts 28 (the reinforcement members) may respectively extend in directions intersecting with the axes of the wood members 12 in a condition in which they are embedded in the wood members 12. Therefore, after the wood members 12 are collapsed between the stopper bolts 6$b$ (the pressure receiving members) of the side members 5 and the shafts 28 due to the impact load F, the shafts 28 may be deformed or broken. That is, at the beginning of collapse, the shock-absorbing members 10 may be collapsed under the collapse load F0 under which the wood members 12 may be collapsed alone. Thereafter, the shock-absorbing members 10 may be collapsed under the collapse load F1 corresponding to the sum of the collapse load F0 under which the wood members 12 may be collapsed alone and the load under which the shafts 28 may be deformed. Therefore, the impact load F may be absorbed in a stepwise fashion. Further, the shafts 28 may be integrally formed with the covering members 20 covering the wood members 12 by injection molding. Therefore, the shafts 28 may be easily formed.

Modified Embodiments

Figure 10:
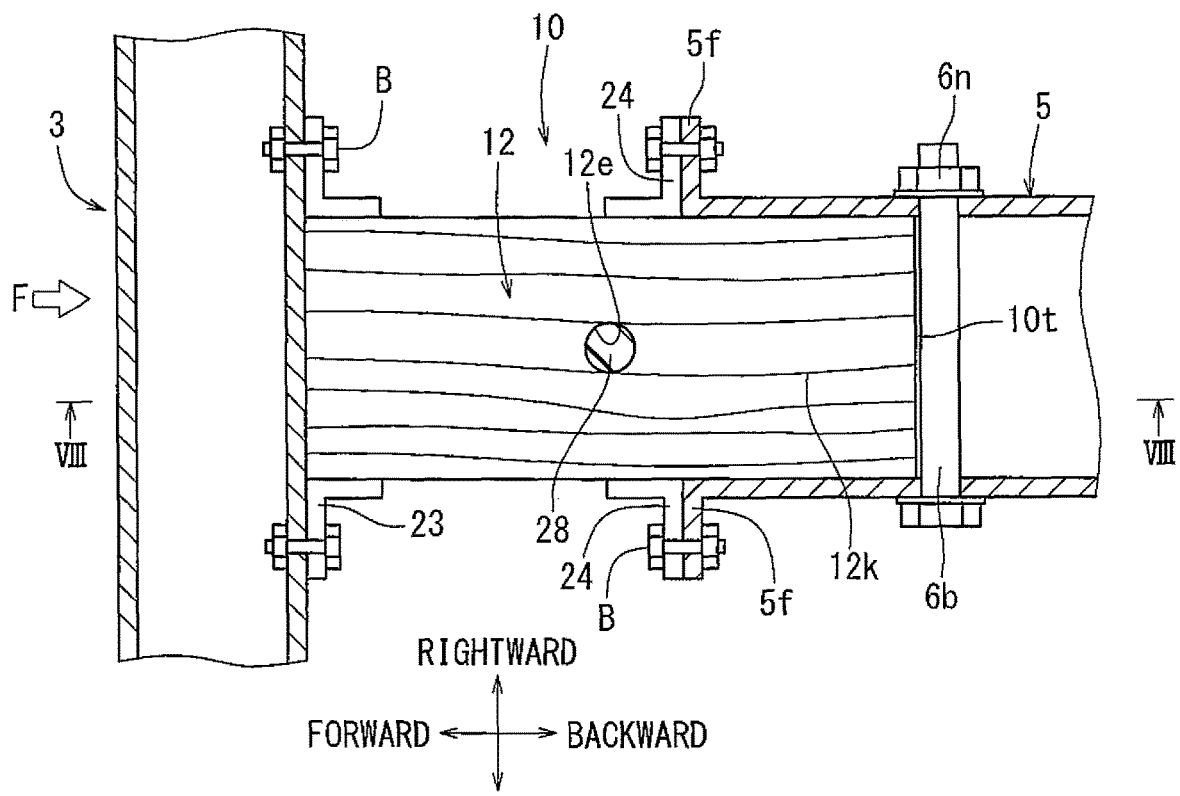
FIG. 10 is a horizontal sectional view showing an attaching structure of vehicle shock-absorbing members according to a Modified Embodiment 1.
Figure 11:
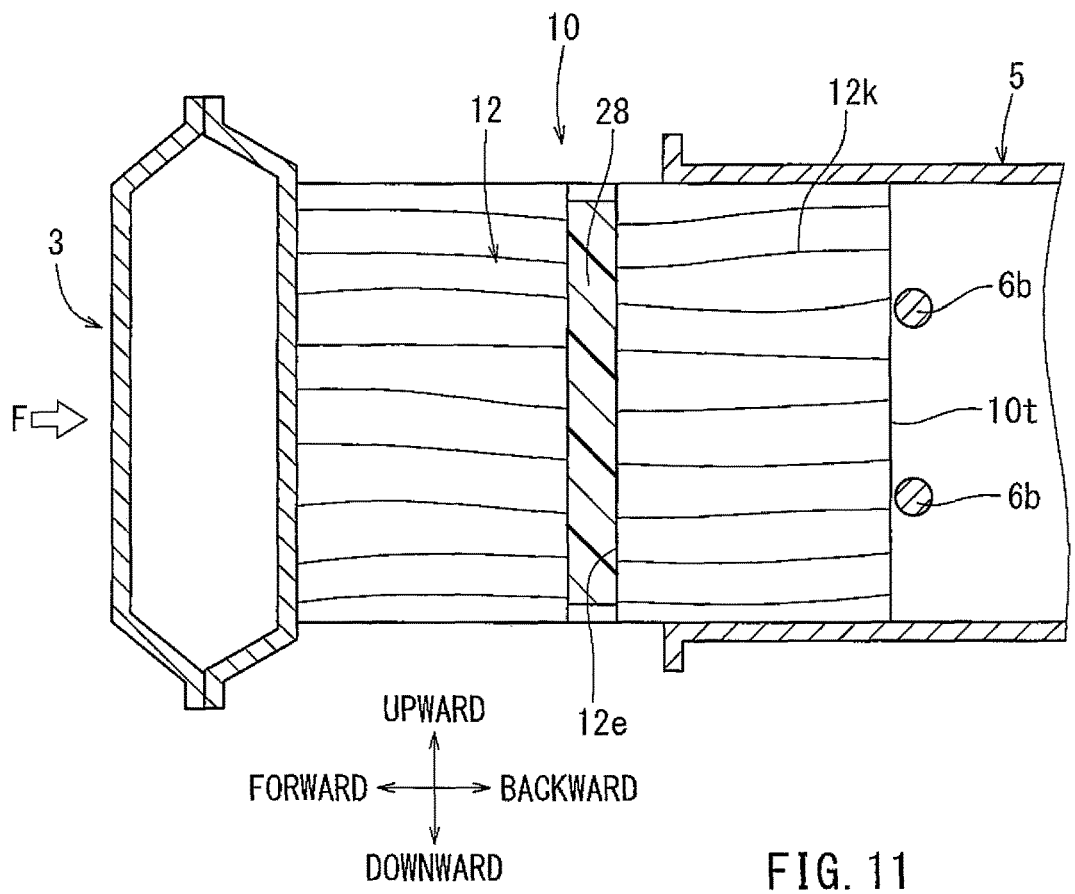
FIG. 11 is a vertical sectional view showing the attaching structure of the vehicle shock-absorbing members according to the Modified Embodiment 1.

The embodiment described above can be changed or modified without departing from the scope of the disclosure. For example, in the embodiment, as shown in FIGS. 3 and 4, the wood members 12 are respectively covered by the covering members 20. Further, the shafts 28 (the reinforcement members) may be integrally formed with the covering members 20. However, as shown in FIGS. 10 and 11, the covering members 20 may be omitted. In such a case, the resin shafts 28 may be separately formed and inserted into the through bores 12$e$ of the wood members 12. Further, the resin shafts 28 may respectively be replaced with metal shafts. Further, in the embodiment, the shafts have a circular shape in cross section. However, the cross-sectional shape of the shafts may be changed as necessary. Further, each of the wood members 12 may have a plurality of through bores 12$e$ such that a plurality of shafts may be introduced thereinto.

Figure 12:
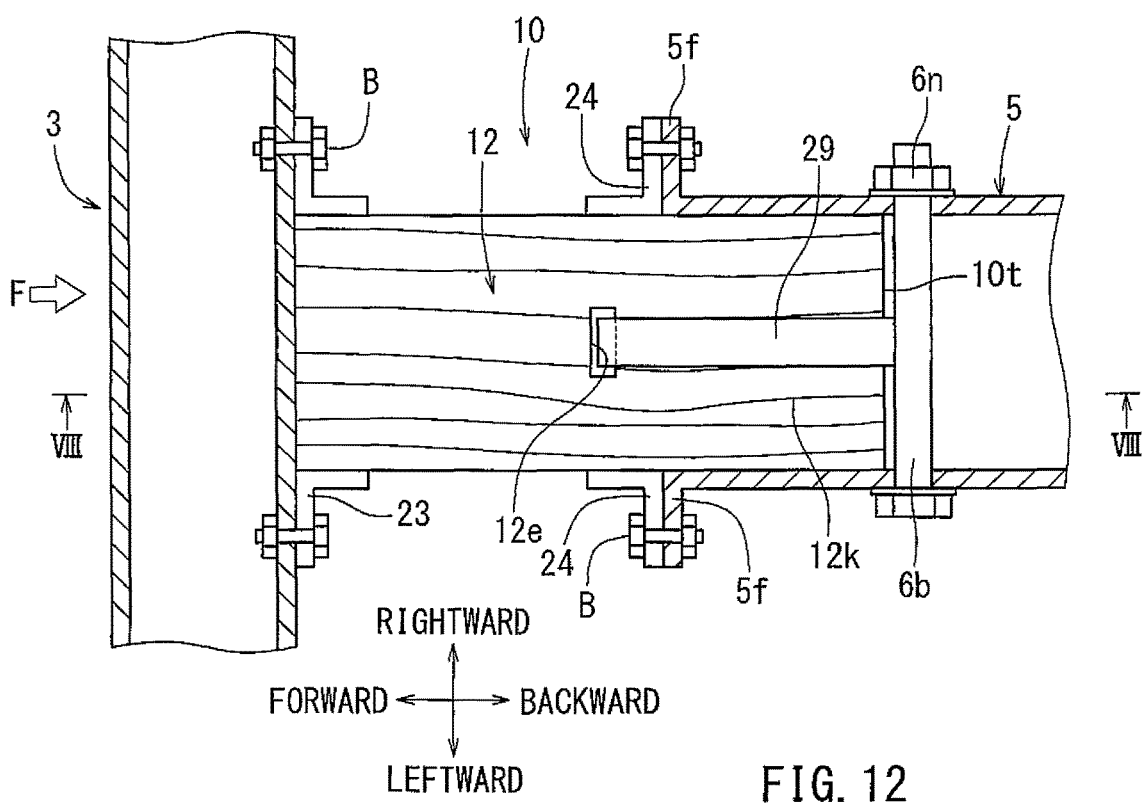
FIG. 12 is a horizontal sectional view showing an attaching structure of vehicle shock-absorbing members according to a Modified Embodiment 2.
Figure 13:
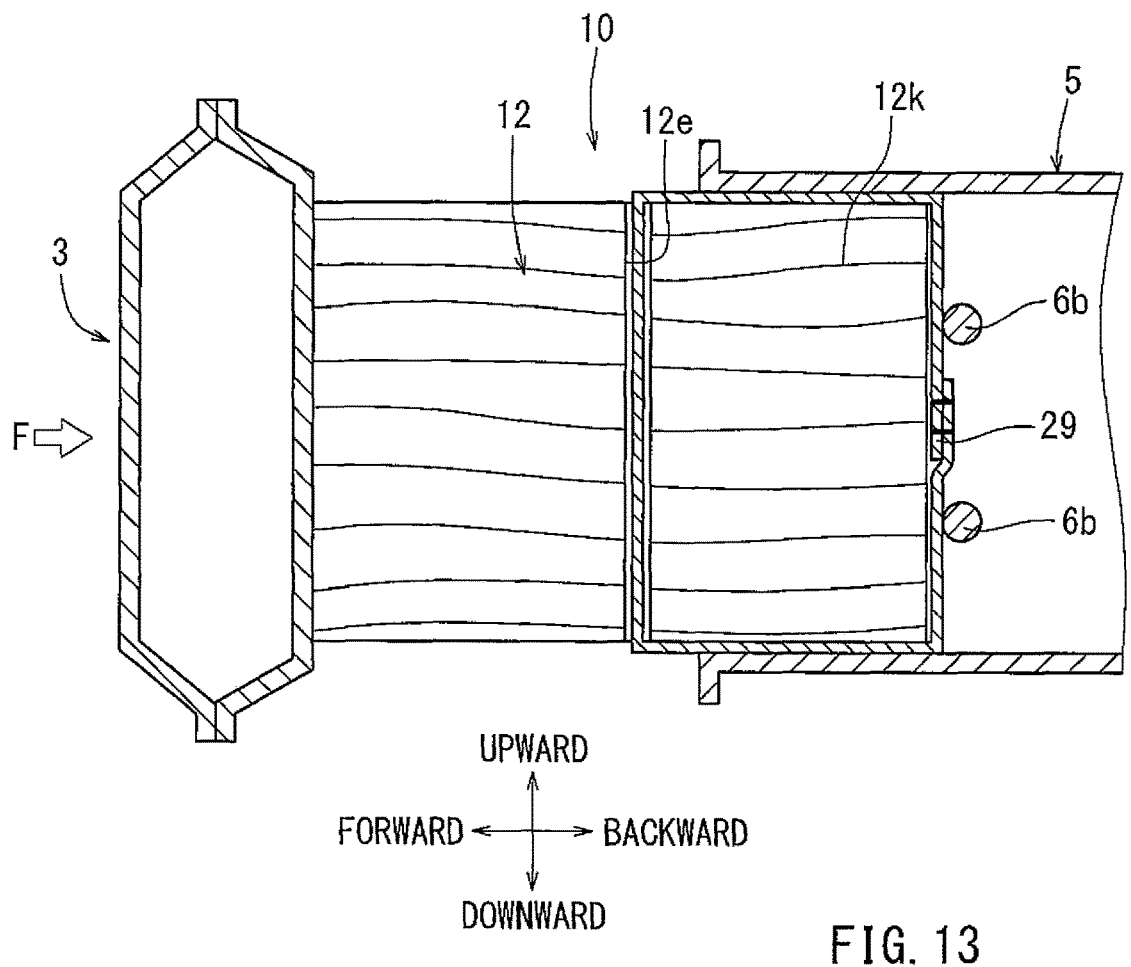
FIG. 13 is a vertical sectional view showing the attaching structure of the vehicle shock-absorbing members according to the Modified Embodiment 2.
Figure 14:
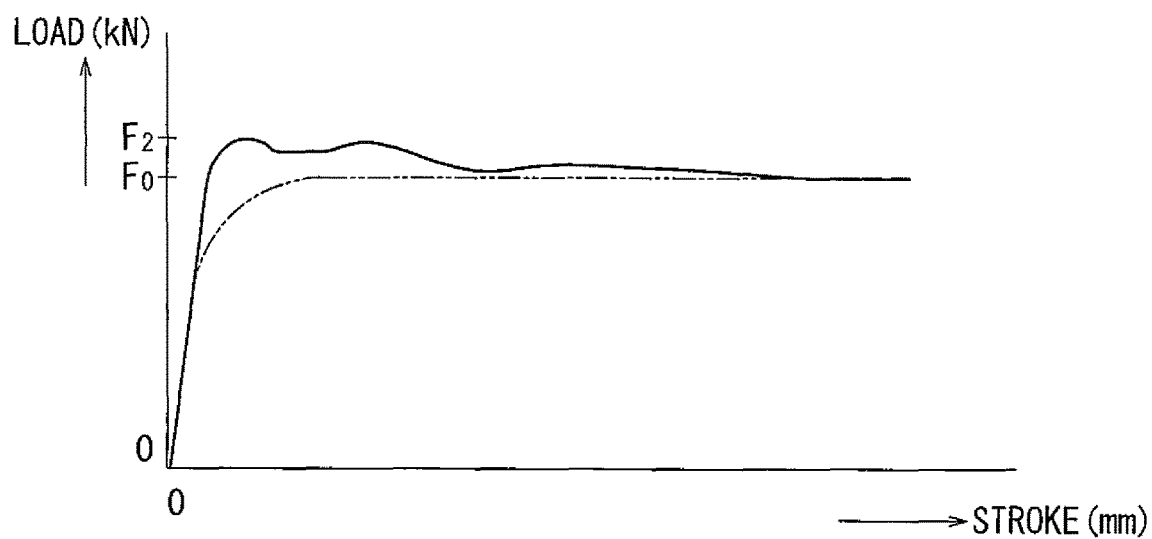
FIG. 14 is a graph illustrating a relationship between a collapse-initiating load and a collapsing stroke in the vehicle shock-absorbing members according to the Modified Embodiment 2.

Further, in the embodiment, the through bores 12$e$ are formed in the wood members 12, and the shafts 28 (the reinforcement members) are respectively introduced into the through bores 12$e$. However, as shown in FIGS. 12 and 13, band-shaped members 29 made from resin or steel plates may respectively be inserted into the through bores 12$e$ of the wood members 12, so as to be looped around left surfaces, right surfaces and the rear end surfaces 10$t$ of the rear portions of the wood members 12 and then be fastened. In this structure, in a condition in which the impact load F is applied to the bumper reinforcement member 3, the wood members 12 may be collapsed while the band-shaped members 29 may be deformed. Therefore, as shown in FIG. 14, the shock-absorbing members 10 may be axially collapsed under a collapse load F2 corresponding to the sum of the collapse load F0 under which the wood members 12 may be collapsed alone and a load under which the band-shaped members 29 may be deformed.

Further, for example, after the band-shaped members 29 are broken, the shock-absorbing members 10 may be axially collapsed under the collapse load F0 under which the wood members 12 may be collapsed alone. Thus, when the band-shaped members 29 are used, a collapse starting load of the shock-absorbing members 10 may be increased. Further, in this disclosure, each of the band-shaped members 29 may be referred to as a reinforcement member that is configured to reinforce the one end side (the rear end side) of each of the wood members 12.

Further, as shown in FIG. 12 and other figures, with regard to the shock-absorbing members 10 in which the band-shaped members 29 are used, the covering members 20 are omitted. However, the wood members 12 may respectively be covered by the covering members 20 after the band-shaped members 29 are attached to the wood members 12. Further, in the embodiment, the shock-absorbing members 10 for use in the vehicle are exemplified. However, the shock-absorbing members in this disclosure may be used in, for example, buildings, trains and ships.

The invention claimed is:

1. A shock-absorbing member wherein a columnar shaped-wood member is supported by a pressure-receiving member at its axially one end side and is configured such that an impact load is applied to its axially another end side, and wherein the wood member is axially collapsed by the impact load applied thereto, thereby absorbing a portion of the impact load, comprising:

a reinforcement member that extends in a direction intersecting with an axis of the wood member while being embedded in the wood member, so as to reinforce the wood member, wherein the wood member is covered by a resin covering member, and wherein the reinforcement member is a resin shaft that is introduced into a through bore formed in the wood member and extending in the direction intersecting with the axis of the wood member, so as to be integrated with the covering member.

2. The shock-absorbing member as described in claim 1, wherein the axially one end side of the wood member is inserted into a tubular side member extending in a vehicle front-back direction, wherein the pressure-receiving member supporting the axially one end side of the wood member is an insertion-limiting stopper disposed in the side member, and wherein the axially another end side of the wood member is connected to a vehicle bumper reinforcement member.

3. The shock-absorbing member as described in claim 2, wherein the insertion-limiting stopper as the pressure-receiving member is a bolt that is positioned so as to extend across a space of the side member, and wherein the reinforcement member intersects with the bolt.

4. A manufacturing method of a shock-absorbing member wherein a columnar shaped-wood member is supported by a pressure-receiving member at its axially one end side and is configured such that an impact load is applied to its axially another end side, wherein the wood member is covered by a resin covering member, wherein a reinforcement member formed as a resin shaft is introduced into a through bore extending in a direction intersecting with an axis of the wood member, so as to be integrated with the covering member, and wherein the wood member is axially collapsed by the impact load applied thereto, thereby absorbing a portion of the impact load, comprising the steps of:

forming the through bore in the wood member;

setting the wood member having the through bore formed therein on a molding tool of an injection molding machine; and closing the molding tool of the injection molding machine and injecting melted resin materials into the molding tool, thereby molding the covering member and molding the resin shaft within the through bore of the wood member.

\* \* \* \* \*